(12) United States Patent
McCloy et al.

(10) Patent No.: US 11,125,121 B2
(45) Date of Patent: Sep. 21, 2021

(54) DUAL ACTUATING VARIABLE CAM

(71) Applicant: BorgWarner Inc., Auburn Hills, MI (US)

(72) Inventors: Chad McCloy, Cortland, NY (US); Xiaoyu Lu, Lansing, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 192 days.

(21) Appl. No.: 16/263,025

(22) Filed: Jan. 31, 2019

(65) Prior Publication Data

US 2019/0242277 A1 Aug. 8, 2019

Related U.S. Application Data

(60) Provisional application No. 62/632,728, filed on Feb. 20, 2018, provisional application No. 62/625,613, filed on Feb. 2, 2018.

(51) Int. Cl.
*F01L 1/047* (2006.01)
*F01L 1/352* (2006.01)
(Continued)

(52) U.S. Cl.
CPC ............. *F01L 1/352* (2013.01); *F01L 1/047* (2013.01); *F16D 3/10* (2013.01); *F01L 2001/0473* (2013.01); *F01L 2001/0537* (2013.01); *F01L 2001/34486* (2013.01); *F01L 2001/34493* (2013.01); *F01L 2250/02* (2013.01);
(Continued)

(58) Field of Classification Search
CPC ......... F01L 1/352; F01L 1/047; F01L 1/3442; F01L 1/348; F01L 1/34413; F01L 1/08; F01L 2001/0473; F01L 2001/0537; F01L 2001/34453; F01L 2001/34486; F01L 2001/34493; F01L 2001/34459;
(Continued)

(56) References Cited

U.S. PATENT DOCUMENTS 5,123,884 A * 6/1992 Kondoh .................... F16H 1/32
464/89
5,417,186 A * 5/1995 Elrod ................... F01L 13/0057
123/90.17
(Continued)

FOREIGN PATENT DOCUMENTS

EP 3141711 A1 * 3/2017 ............ F01L 1/3442

*Primary Examiner* — Devon C Kramer
*Assistant Examiner* — Kelsey L Stanek
(74) *Attorney, Agent, or Firm* — Reising Ethington P.C.

(57) ABSTRACT

A variable camshaft timing system including a first camshaft phaser having an input that is configured to receive rotational force from a crankshaft and an output that is configured to link with a first camshaft of a concentric camshaft assembly to change the angular position of the first camshaft relative to a crankshaft; and a second camshaft phaser having an output that is configured to link with a second camshaft of the concentric camshaft assembly to change the angular position of the second camshaft relative to the crankshaft, wherein the first camshaft is concentrically positioned to the first camshaft and the first camshaft phaser is mechanically linked to the second camshaft phaser to communicate rotational force from the crankshaft to the second camshaft phaser through the first camshaft phaser and the mechanical link.

12 Claims, 5 Drawing Sheets

(51) Int. Cl.
   *F16D 3/10*     (2006.01)
   *F01L 1/344*    (2006.01)
   *F01L 1/053*    (2006.01)

(52) U.S. Cl.
   CPC ........ *F01L 2250/04* (2013.01); *F01L 2311/00* (2020.05); *F01L 2820/032* (2013.01); *F01L 2820/033* (2013.01)

(58) Field of Classification Search
   CPC .............. F01L 2250/02; F01L 2250/04; F01L 2820/032; F01L 2820/033; F16D 3/10
   USPC ........................................... 123/90.17, 90.31
   See application file for complete search history.

(56) References Cited

U.S. PATENT DOCUMENTS

| | | | | |
|---|---|---|---|---|
| 7,466,053 | B1* | 12/2008 | Radev | H02K 1/32 310/114 |
| 2010/0235067 | A1* | 9/2010 | Nomura | F02D 13/0238 701/103 |
| 2017/0198755 | A1* | 7/2017 | Brown | F16D 3/64 |
| 2019/0085734 | A1* | 3/2019 | McCloy | F01L 1/352 |
| 2019/0170027 | A1* | 6/2019 | Poole | F01L 1/352 |

* cited by examiner

DUAL ACTUATING VARIABLE CAM

CROSS-REFERENCE TO RELATED APPLICATIONS

This application claims the benefit of U.S. Patent Application No. 62/625,613 filed on Feb. 2, 2018, and U.S. Patent Application No. 62/632,728 filed on Feb. 20, 2018, the disclosures of which are herein incorporated by reference in their entirety.

TECHNICAL FIELD

The present application relates to internal combustion engines and, more particularly, to variable camshaft timing of camshafts used with internal combustion engines.

BACKGROUND

Internal combustion engines (ICEs) use one or more camshafts to open and close intake and exhaust valves in response to cam lobes selectively actuating valve stems as the camshaft(s) rotate overcoming the force of valve springs that keep the valves seated and displacing the valves. The shape and angular position of the cam lobes can affect the operation of the ICE. In the past, the angular position of the camshaft relative to the angular position of the crankshaft was fixed. But it is possible to vary the angular position of the camshaft relative to the crankshaft using variable camshaft timing (VCT). VCT can be implemented using camshaft phasing devices (sometimes referred to as cam phasers) that change the angular position of the camshaft relative to the crankshaft. These cam phasers can be hydraulically- or electrically-actuated and are typically directly attached to one end of the camshaft.

Concentric camshafts including an inner camshaft and an outer camshaft can be used to vary the angular position of the inner camshaft relative to the outer camshaft. Typically, one of the concentric camshafts (the inner camshaft or outer camshaft) has a fixed angular position relative to the angular position of the crankshaft. The angular position of the other concentric camshaft is then varied relative to the camshaft with the fixed relative angular position. However, modern internal combustion engines (ICEs) benefit from increasingly flexible variable camshaft timing configurations. It would be helpful to increase the amount of control over the angular positions of the inner camshaft and the outer camshaft relative to the crankshaft.

SUMMARY

In one embodiment, a variable camshaft timing system includes a first camshaft phaser having an input that is configured to receive rotational force from a crankshaft and an output that is configured to link with a first camshaft of a concentric camshaft assembly to change the angular position of the first camshaft relative to a crankshaft; and a second camshaft phaser having an output that is configured to link with a second camshaft of the concentric camshaft assembly to change the angular position of the second camshaft relative to the crankshaft, wherein the first camshaft is concentrically positioned to the second camshaft and the first camshaft phaser is mechanically linked to the second camshaft phaser to communicate rotational force from the crankshaft to the second camshaft phaser through the first camshaft phaser and the mechanical link.

In another embodiment, a variable camshaft timing system includes a hydraulically-actuated camshaft phaser having an input that is configured to receive rotational force from a crankshaft, an output that is configured to couple with a first camshaft of a concentric camshaft assembly to change the angular position of the first camshaft relative to a crankshaft, a first camshaft input sprocket, and a second camshaft input sprocket; an electrically-actuated camshaft phaser having an output that is configured to link with a second camshaft of the concentric camshaft assembly to change the angular position of the second camshaft relative to the crankshaft, a first camshaft drive sprocket, and a second camshaft drive sprocket, wherein the first camshaft is concentrically positioned to the second camshaft, the first camshaft drive sprocket directly engages the first camshaft input sprocket, and the second camshaft drive sprocket directly engages the second camshaft input sprocket.

In yet another embodiment, a variable camshaft timing system includes a first electrically-actuated camshaft phaser having an output that is configured to couple with a first camshaft of a concentric camshaft assembly and change the angular position of the first camshaft relative to a crankshaft using at least one planetary gear; a second electrically-actuated camshaft phaser having an output that is configured to couple with a second camshaft of the concentric camshaft assembly and change the angular position of the second camshaft relative to the crankshaft using at least one planetary gear, wherein the first camshaft is concentrically positioned to the first camshaft; a housing, configured to receive rotational force from a crankshaft, having a ring gear that engages the planetary gear(s) of the first electrically-actuated camshaft phaser and the planetary gear(s) of the second electrically-actuated camshaft phaser, wherein the first electrically-actuated camshaft phaser, the second electrically-actuated camshaft phaser, the first camshaft, the second camshaft, and the housing rotate about a common axis.

DETAILED DESCRIPTION

A variable camshaft timing (VCT) system includes a plurality of variable camshaft timing devices (also referred to as camshaft phasers) that control the angular position of an inner camshaft and an outer camshaft included in a concentric camshaft assembly relative to a crankshaft. A first camshaft phaser and a second camshaft phaser each include an input and an output. The input of the first camshaft phaser can be driven by the crankshaft via a crankshaft sprocket. The input of the second camshaft phaser can be mechanically linked with the first camshaft phaser such that the rotational force from the crankshaft is communicated to the second camshaft phaser through the first camshaft phaser. The mechanical link between the first camshaft phaser and the second camshaft phaser can be made directly such that a portion of the first camshaft phaser engages or couples with a portion of the second camshaft phaser without using an endless loop. The output of the first camshaft phaser can be coupled with a first camshaft of the concentric camshaft assembly and an output of the second camshaft phaser can be coupled with a second camshaft of the concentric camshaft assembly. The VCT system can then rotate or drive the first camshaft and the second camshaft (e.g., the outer camshaft and the inner camshaft) using the rotational energy from the crankshaft and also change the angular position of the first camshaft and the angular position of the second camshaft independently from each other. The first camshaft phasers and second camshaft phasers can be implemented using two electrically-actuated camshaft phasers, two hydraulically-actuated camshaft phasers, or one electrically-actuated camshaft phaser and one hydraulically-actuated camshaft phaser. Further, the first camshaft phaser and the second camshaft phaser can be positioned radially apart from each other or the first camshaft phaser and the second camshaft phaser can be positioned on a common axis adjacent to each other such that the rotation of the first camshaft phaser is coaxial with the rotation of the second camshaft phaser.

Figure 1:
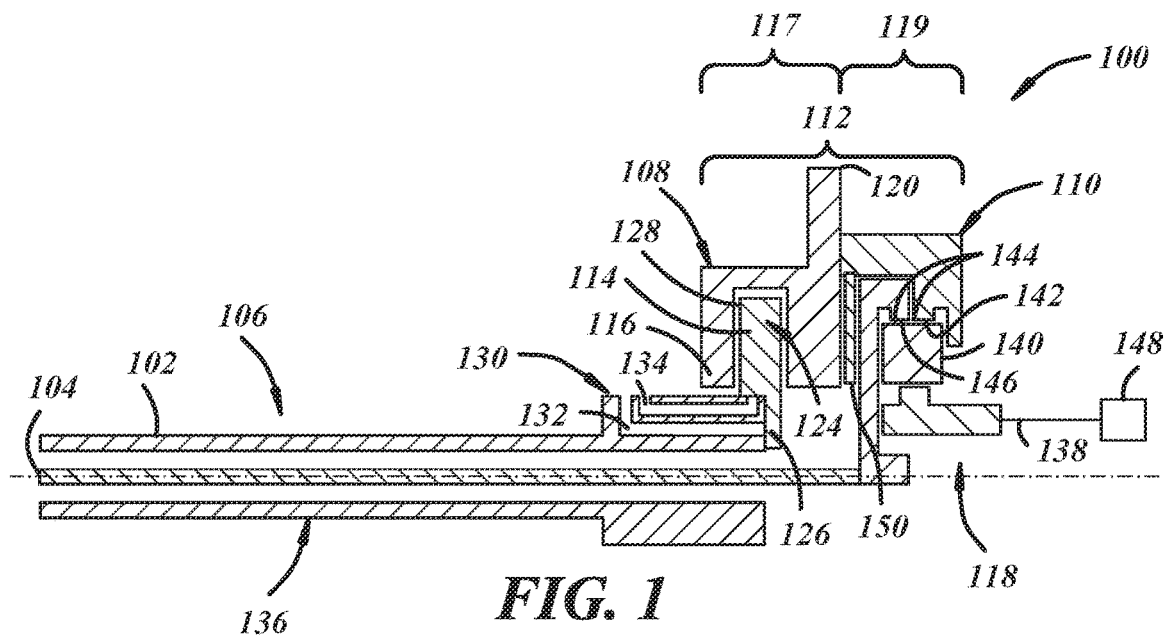
FIG. 1 is a profile view depicting an implementation of a variable camshaft timing (VCT) system including a hydraulically-actuated camshaft phaser, an electrically-actuated camshaft phaser, and a concentric camshaft assembly.

Turning to FIGS. 1-4, an implementation of a variable camshaft timing system (VCT) 100 is shown. The VCT system 100 includes a first camshaft 102 and a second camshaft 104 that are concentric to each other forming a concentric camshaft assembly 106. Concentric camshafts are known by those skilled in the art, an example of which is shown in FIG. 1 of U.S. Pat. No. 8,186,319 and described in column 6, lines 10-53; the contents of that portion of U.S. Pat. No. 8,186,319 are incorporated by reference. A first camshaft phaser 108 is coupled with the first camshaft 102 and a second camshaft phaser 110 is coupled with the second camshaft 104. The first camshaft phaser 108 is implemented using a hydraulically-actuated camshaft phaser and the second camshaft phaser 110 is implemented using an electrically-actuated camshaft phaser. The first camshaft phaser 108 includes an input and an output. The input of the first camshaft phaser 108 is received by a housing 112 and the output is coupled with the first camshaft (e.g. the outer camshaft). The input of the second camshaft phaser 110 is also received via the housing 112 and the output is coupled with the second camshaft (e.g. the inner camshaft 104). It should be appreciated that, in other implementations, the output of a first camshaft phaser can be coupled with an inner camshaft and the output of a second camshaft phaser can be coupled with an outer camshaft.

The first camshaft phaser 108 includes a rotor 114, and a stator 116 that is included in a portion of the housing 112. The housing 112 can include a hydraulically-actuated phaser portion 117 and an electrically-actuated phaser portion 119. The hydraulically-actuated phaser portion 117 can receive the rotor 114 of the first camshaft phaser 108 and act as the stator 116. The housing 112 can include an inner plate 113 and an outer plate 115 that axially constrain the rotor 114 and at least partially define one or more fluid chambers used with the rotor 114. The electrically-actuated phaser portion 119 can engage a mechanical gearbox 118 that changes the angular position of the output of the second camshaft phaser 110 relative to the input of the second camshaft phaser 110. The housing 112 can mechanically link the first camshaft phaser 108 with the second camshaft phaser 110. In this implementation, the first camshaft phaser 108 can be coupled to the second camshaft phaser 110 by mechanically fastening a flex plate 121 attached to the second camshaft phaser 110 with the hydraulically-actuated phaser portion 117 of the housing 112 using any one of a number of fastening techniques, such as threaded bolts. The flex plate 121 can permit angular deflection of the first camshaft 102 and the first camshaft phaser 108 relative to the second camshaft 104 and the second camshaft phaser 110 such that the concentric camshafts may be displaced relative to each other due to misalignment. In addition, the housing 112 can include a plurality of radially-outwardly facing gear teeth 120. An endless loop (not shown), such as a chain or a belt, can engage both the teeth of a crankshaft sprocket (not shown) and the gear teeth 120 of the housing 112 thereby transmitting the rotational force from a crankshaft to the housing 112.

The rotor 114 of the first camshaft phaser 108 can be coupled with the output of the first camshaft phaser 108 such that the rotor 114 and the outer camshaft 102 are angularly fixed relative to each other. The rotor 114 includes one or more vanes 124 that extend radially outwardly from a hub 126 into fluid chamber(s) 128 of the stator 116. The stator 116 includes fluid chambers 128 in the housing 112 within which the vanes 124 move angularly with respect to the stator 116 about an axis. Pressurized fluid can be supplied from a fluid source (not shown) through a plurality of fluid supply lines 130 to the fluid chambers 128. In this implementation, the fluid supply lines 130 pass through a camshaft 136 and communicate pressurized fluid, such as engine oil, to the fluid chambers 128 in the housing 112. To move the rotor 114 relative to the stator 116 in one angular direction, the pressurized fluid can be directed through a first fluid supply line 132 to one side of the vane(s) 124 and to move the rotor 114 relative to the stator 116 in another angular direction, the pressurized fluid can be directed through a second fluid supply line 134 to an opposite side of the vane(s) 124. A range of authority can be defined by the angular distance the fluid chambers 128 permit the rotor 114 to move relative to the housing 112.

The second camshaft phaser 110 includes a mechanical gearbox 118 having a sun gear 138, a plurality of planetary gears 140, and at least one ring gear 142. The electrically-actuated phaser portion 119 of the housing 112 can include the ring gear 142 having a plurality of radially-inwardly facing gear teeth 144. The inner camshaft 104 can be coupled with a sprocket gear 146 that includes a plurality of gear teeth 144 on a radially-inwardly facing surface. The plurality of planetary gears 140 can each include a plurality of gear teeth 144 on a radially outwardly facing surface that engage both the ring gear 142 of the housing 112 as well as the sprocket gear 146 coupled with the inner camshaft 104.

The sun gear 138 can include gear teeth on a radially-outwardly facing outer surface and be positioned radially-inwardly from the planetary gears 140 such that the sun gear 138 engages the planetary gears 140. An electric motor 148 can be coupled to the sun gear 138 through an output shaft.

As the crankshaft rotates during engine operation, the housing 112 rotates in response to the rotation of the endless loop. The first camshaft phaser 108 can alter the angular position of the outer camshaft 102 relative to the crankshaft and the second camshaft phaser 110 can alter the angular position of the inner camshaft 104 relative to the crankshaft. With respect to the hydraulically-actuated first camshaft phaser 108, the rotor 114 can be mechanically locked into place with reference to the housing 112, such as by engaging a locking pin, thereby fixing the angular position of the rotor 114 relative to the stator 116 and, thus, the outer camshaft 102 relative to the crankshaft. The angular position of the rotor 114 relative to the stator 116 (and the housing 112) can be changed by disengaging the mechanical lock and applying pressurized fluid through the fluid supply lines 130. Selectively applying pressurized fluid to the first fluid supply line 132 can advance the angular position of the rotor 114 relative to the housing 112 and selectively applying pressurized fluid to the second fluid supply line 134 can retard the angular position of the rotor 114 relative to the housing 112.

The housing 112 transmits the rotational energy received from the crankshaft from the ring gear 142 to the planetary gear(s) 140. The planetary gears 140, by virtue of engaging the ring gear 142 and the sprocket gear 146, communicate the rotational energy from the housing 112 to the sprocket gear 146 attached to the inner camshaft 104. As the housing 112 rotates in response to the rotation of the crankshaft, the electric motor 148 of the electrically-actuated second camshaft phaser 110 rotates the sun gear 138. Depending on whether the angular position or the timing of the inner camshaft 104 will be advanced, retarded, or maintained relative to the crankshaft, the angular velocity of the output shaft of the electric motor 148 can be increased, decreased, or maintained relative to the angular velocity at which the housing 112 is rotated by the endless loop. The ring gear 142 can have a different number of gear teeth relative to the sprocket gear 146. In one implementation, the difference in the number of gear teeth can equal the number of planetary gears 140. For example, if the gearbox includes three planetary gears 140, the sprocket gear 146 can have 3 fewer teeth than the ring gear 142. As a result, when the output shaft of the electric motor 148 rotates at an increased or decreased angular velocity relative to the housing 112, the sprocket gear is angularly displaced relative to the ring gear 142. The second camshaft phaser 110 can include a locking plate 150 that is axially adjacent to the sprocket gear 146 such that the locking plate 150 can selectively engage the sprocket 146 to prevent the angular displacement of the sprocket gear 146 relative to the housing 112. An example of an electrically-actuated camshaft phasing device or camshaft phaser is described in U.S. Patent Application Publication No. 2017/0248045 the entirety of which is incorporated by reference.

Figure 5:
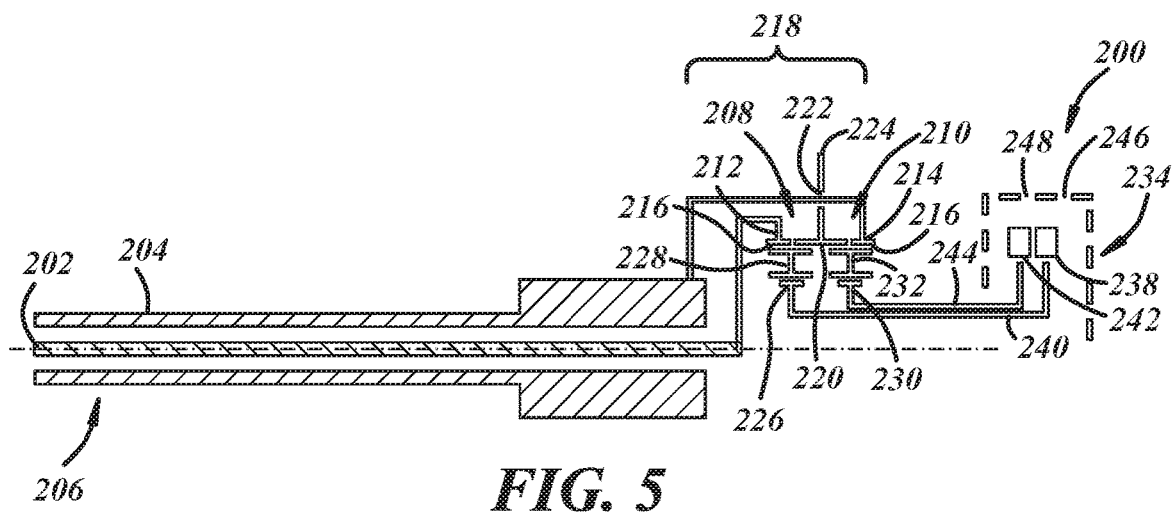
FIG. 5 is a cross-sectional profile view depicting another implementation of a VCT system including two electrically-actuated camshaft phasers and a concentric camshaft assembly.

Turning to FIG. 5, another implementation of a variable camshaft timing system (VCT) 200 is shown. The VCT system 200 includes a first camshaft 202 and a second camshaft 204 that are concentric to each other forming a concentric camshaft assembly 206 as well as a first camshaft phaser 208 and a second camshaft phaser 210. Both the first camshaft phaser 208 and the second camshaft phaser 210 are electrically-actuated. A first camshaft sprocket 212 can be coupled with the first camshaft 202, (e.g., the inner camshaft) and a second camshaft sprocket 214 can be coupled with the second camshaft 204 (e.g., the outer camshaft). The first camshaft sprocket 212 and the second camshaft sprocket 214 can be concentric with each other and each include a plurality of radially-inwardly facing gear teeth 216. The gear teeth 216 of the first camshaft sprocket 212 are axially spaced from the gear teeth 216 of the second camshaft sprocket 214. The first camshaft phaser 208 and the second camshaft phaser 210 can be physically engaged by a housing 218 such that the housing 218 mechanically links the first camshaft phaser 208 with the second camshaft phaser 210. The housing 218 comprises a ring gear 220 that can be positioned axially between the first camshaft sprocket 212 and the second camshaft sprocket 214. The housing 218 or ring gear 220 can include one or more slots 222 through which a portion of the second camshaft sprocket 214 extends through axially thereby positioning the second camshaft sprocket 214 in between an electric motor and the ring gear 220 along the axis of camshaft rotation. The slots 222 can be arcuate having a length that corresponds to a range of authority of the outer camshaft 204, which can control the amount of angular displacement of the second camshaft sprocket 214 relative to the crankshaft. An outer surface of the housing 218 includes a plurality of radially outwardly extending gear teeth 224 that can engage an endless loop, such as a chain or a belt, and communicate rotational force of the crankshaft from a crankshaft sprocket having radially-outwardly facing teeth.

The first sun gear 226 and the second sun gear 230 can be coupled with a dual output electric motor 234. The dual-output electric motor 234 can have two rotors and two stators. The rotors can provide rotational output through concentric output shafts 236. A first rotor 238 can be coupled with an inner output shaft 240 and a second rotor 242 can be coupled with an outer output shaft 244; the inner output shaft 240 and the outer output shaft 244 are concentric to each other. In this implementation; the inner output shaft 240 is coupled with the first sun gear 226 and the outer output shaft 244 is coupled with the second sun gear 230. An electric motor control unit can control the first rotor 238 independent from the control of the second rotor 242. A power source can be electrically linked to a first stator 246 and a second stator 248 through a first switch and a second switch, respectively. The microprocessor can selectively open and close the first and second switches as well and increase and decrease the amount of current supplied to the first stator 246 and the second stator 248.

The first sun gear 226 and the second sun gear 230 can be coupled with a dual output electric motor 234. The dual-output electric motor 234 can have two rotors and two stators. The rotors can provide rotational output through concentric output shafts 236. A first rotor 238 can be coupled with an inner output shaft 240 and a second rotor 242 can be coupled with an outer output shaft 244; the inner output shaft 240 and the outer output shaft 244 are concentric to each other. In this implementation, the inner output shaft 240 is coupled with the first sun gear 226 and the outer output shaft 244 is coupled with the second sun gear 230. An electric motor control unit can control the first rotor 238 independent from the control of the second rotor 240. A power source can be electrically linked to a first stator 246 and a second stator 248 through a first switch and a second switch, respectively. The microprocessor can selectively open and close the first and second switches as well and increase and decrease the amount of current supplied to the first stator 246 and the second stator 248.

As the crankshaft rotates as part of engine operation and the crankshaft sprocket communicates the rotational force of the crankshaft to the housing 218 via the endless loop, the housing 218 rotates imparting the rotation to the inner camshaft 202 and the outer camshaft 204. The dual-output electric motor 234 can rotate the inner output shaft 240 and outer output shaft 244 to rotate the first sun gear 226 and the second sun gear 230, respectively. The angular position of the inner camshaft 202 can be changed relative to the crankshaft and the angular position of the outer camshaft 204 can be changed relative to the crankshaft, independent of the angular position of the inner camshaft 202. When the dual-output electric motor 234 rotates the inner output shaft 240 and the outer output shaft 244 at the same angular velocity as the housing 218 and ring gear 220, the inner camshaft 202 and the outer camshaft 204 can maintain their existing angular position relative to the crankshaft. The dual-output electric motor 234 can change the angular position of the inner camshaft 202 relative to the crankshaft, the outer camshaft 204 relative to the crankshaft, or both. The microprocessor can direct the dual-output electric motor 234 to increase or decrease the angular velocity of the inner output shaft 240 while maintaining the angular velocity of the outer output shaft 244. An increase or decrease in the angular velocity of the first sun gear 226 attached to the inner output shaft 240 relative to the angular velocity of the ring gear 220 rotates the first set of planetary gears 228 thereby displacing the first camshaft sprocket 212 relative to the ring gear 220 and changes the angular position of the first camshaft sprocket 212 and inner camshaft 202 relative to the crankshaft. An increase or decrease in the angular velocity of the second sun gear 230 attached to the outer output shaft 244 relative to the angular velocity of the ring gear 220 rotates the second set of planetary gears 232 thereby displacing the second camshaft sprocket 214 relative to the ring gear 220 and changes the angular position of the second camshaft sprocket 214 and outer camshaft 204 relative to the crankshaft. The increase or decrease in the angular velocity of the inner output shaft 240 can be carried out independently from increases or decreases in the angular velocity of the outer output shaft 244.

Figure 6:
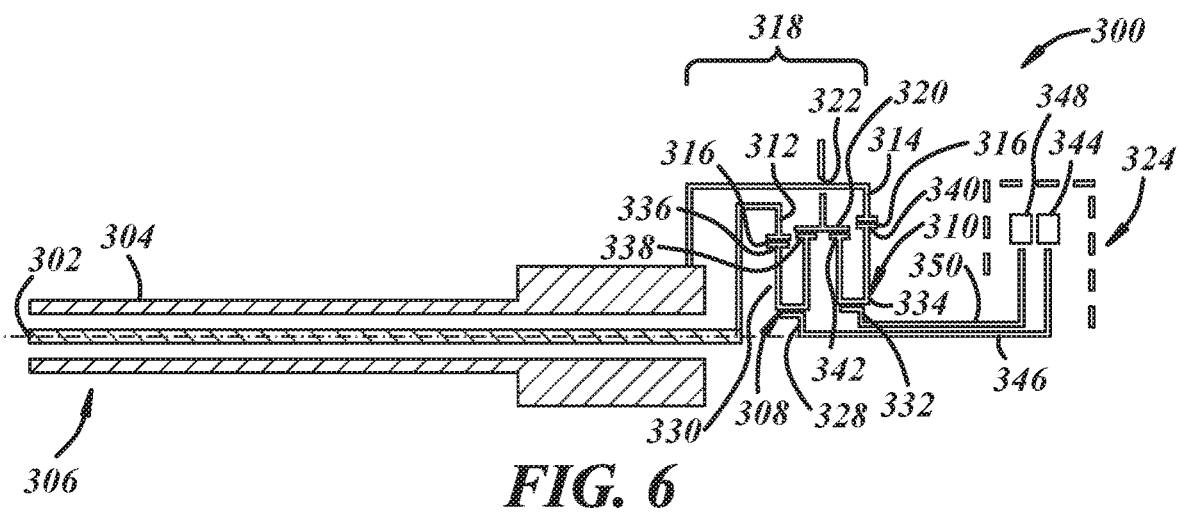
FIG. 6 is a cross-sectional profile view depicting another implementation of a VCT system including two electrically-actuated camshaft phasers and a concentric camshaft assembly.
Figure 2:
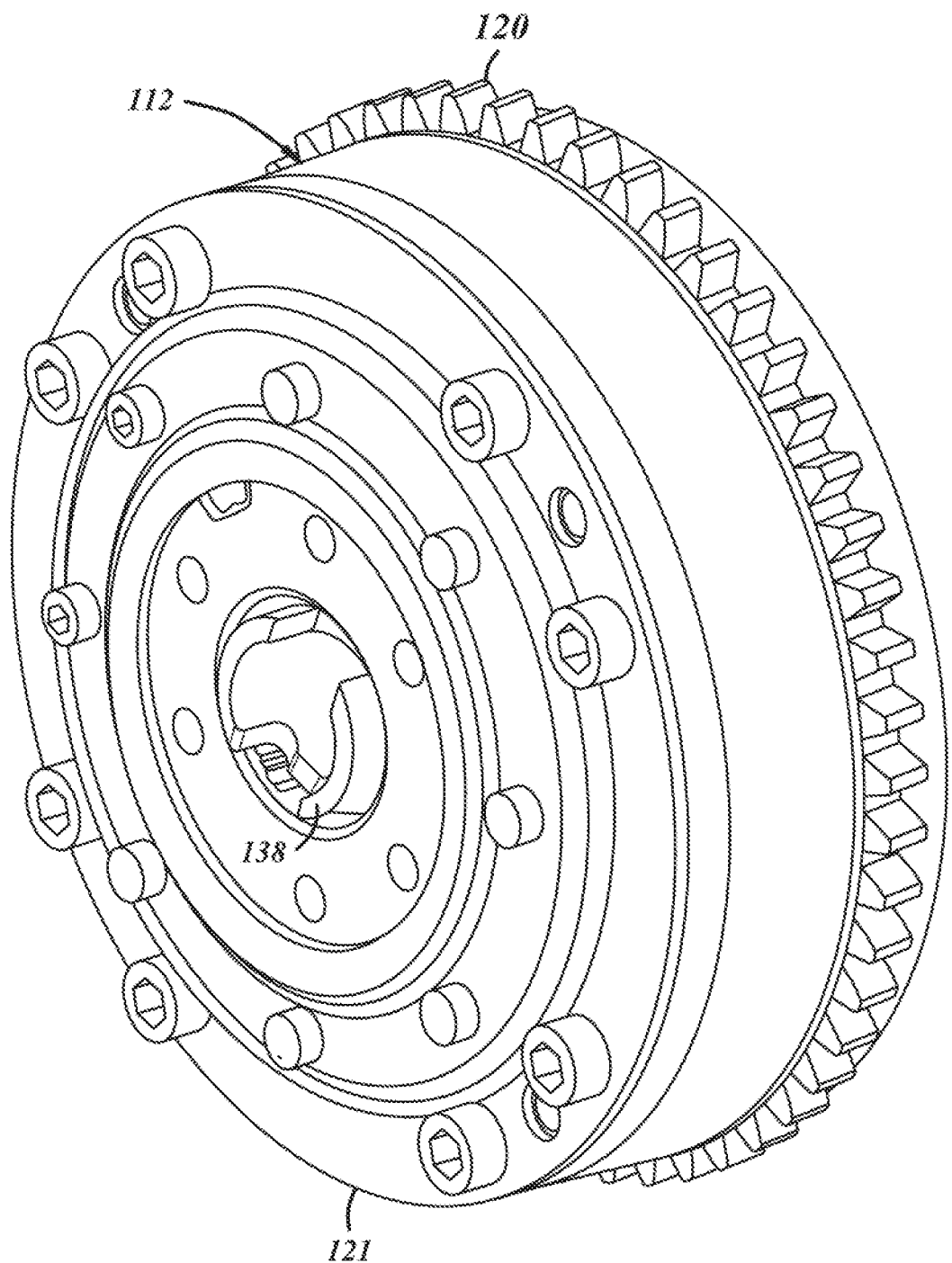
FIG. 2 is a perspective view depicting an implementation of the hydraulically-actuated camshaft phaser and the electrically-actuated camshaft phaser of the VCT system shown in FIG. 1.
Figure 3:
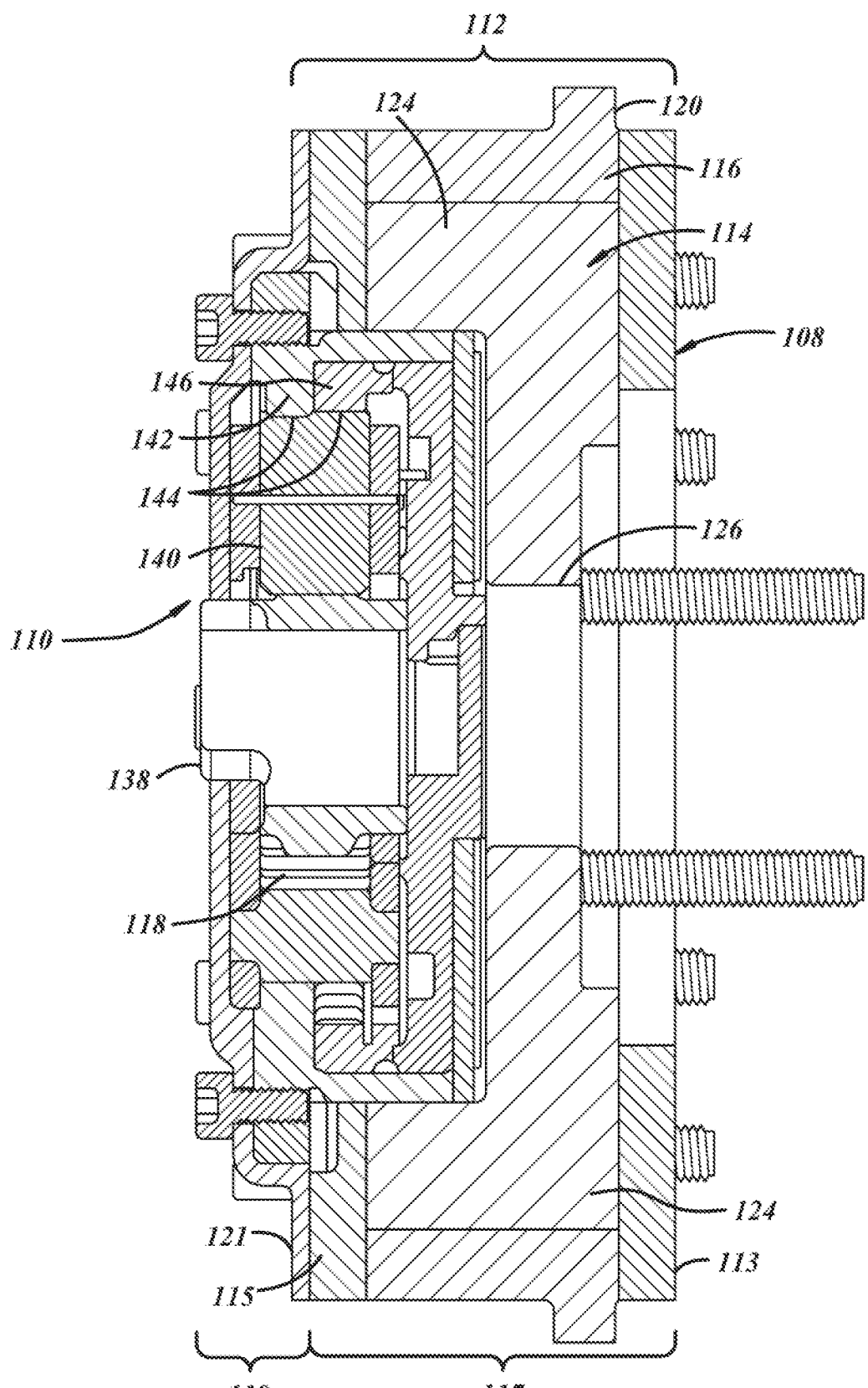
FIG. 3 is a cross-sectional profile view depicting an implementation of the hydraulically-actuated camshaft phaser and the electrically-actuated camshaft phaser of the VCT system shown in FIG. 1.
Figure 4:
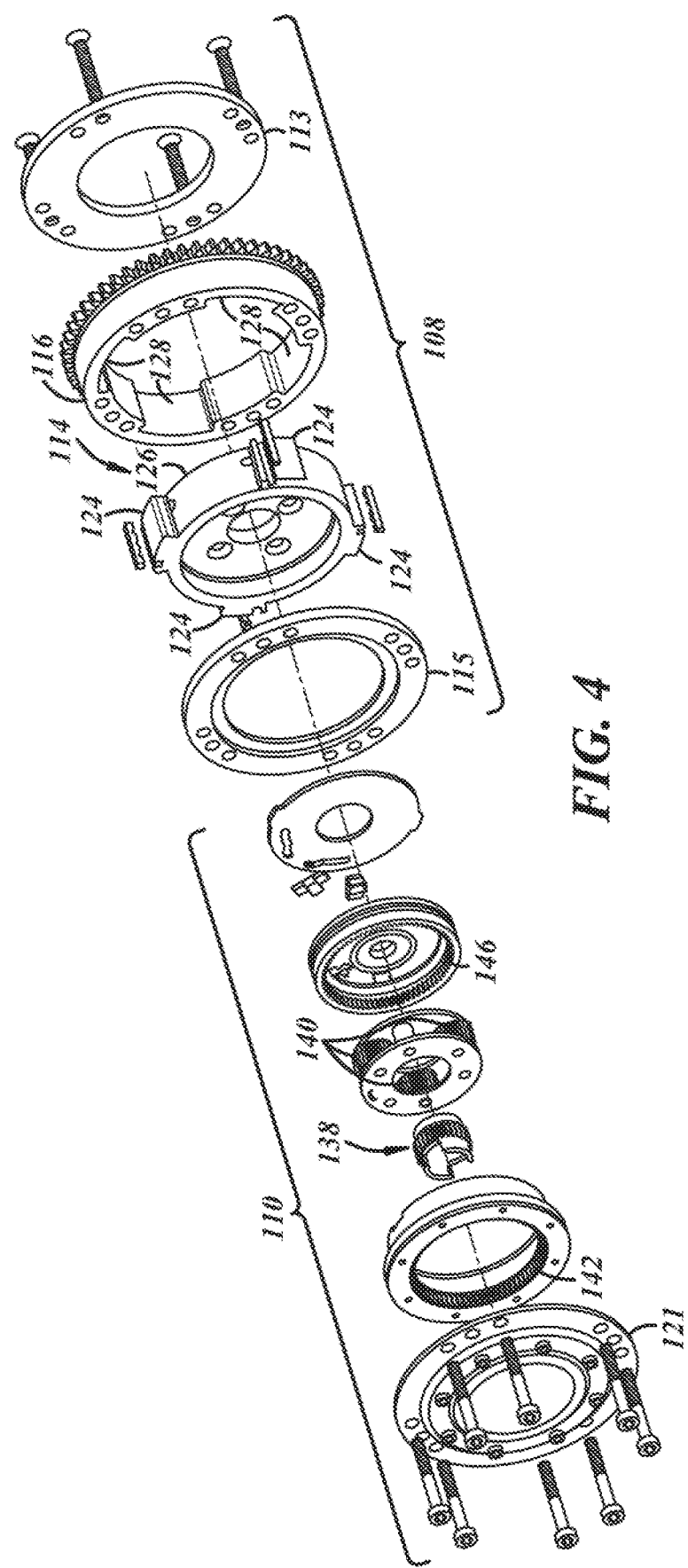
FIG. 4 is an exploded view depicting an implementation of the hydraulically-actuated camshaft phaser and the electrically-actuated camshaft phaser of the VCT system shown in FIG. 1.

FIG. 6 depicts another implementation of a variable camshaft timing system (VCT) 300. The VCT system 300 includes a first camshaft 302 and a second camshaft 304 that are concentric to each other forming a concentric camshaft assembly 306 as well as a first camshaft phaser 308 and a second camshaft phaser 310. Both the first camshaft phaser 308 and the second camshaft phaser 310 are electrically-actuated. A first camshaft sprocket 312 can be coupled with the first camshaft 302, (e.g., the inner camshaft) and a second camshaft sprocket 314 can be coupled with the second camshaft 304 (e.g., the outer camshaft). The first camshaft sprocket 312 and the second camshaft sprocket 314 are concentric with each other and each include a plurality of radially-inwardly facing gear teeth 316. The gear teeth 316 of the first camshaft sprocket 312 are axially spaced from the gear teeth 316 of the second camshaft sprocket 314. The first camshaft phaser 308 and the second camshaft phaser 310 can be physically engaged by a housing 318 such that the housing can mechanically link the first camshaft phaser 308 with the second camshaft phaser 310 such that the housing 318 constrains angular displacement of the first camshaft phaser 308 relative to the second camshaft phaser 310. The housing 318 comprises a ring gear 320 that can be positioned axially between the first camshaft sprocket 312 and the second camshaft sprocket 314. The housing 318 or ring gear 320 can include one or more slots 322 through which a portion of the second camshaft sprocket 314 extends through axially thereby positioning the radially-inwardly facing gears in between a dual output electric motor 324 and the ring gear 320. The duel output electric motor includes two motors, two stators, and concentric output shafts as described above. The slots 322 can be arcuate having a length that corresponds to a range of authority of the outer camshaft 304, which can control the amount of angular displacement of the second camshaft sprocket 314 relative to the crankshaft. An outer surface of the housing includes a plurality of radially outwardly extending gear teeth 326 that can engage an endless loop (not shown), such as a chain or a belt, and communicate rotational force of the crankshaft from a crankshaft sprocket having radially-outwardly facing teeth.

The first camshaft phaser 308 includes a first eccentric shaft 328 engaging a first compound planetary gear 330 and the second camshaft phaser 310 includes a second eccentric shaft 332 engaging a second compound planetary gear 334. The first compound planetary gear 330 includes inner camshaft sprocket teeth 336 and first ring teeth 338. The second compound planetary gear 334 includes outer camshaft sprocket teeth 340 and second ring teeth 342. The first eccentric shaft 328 and the second eccentric shaft 332 can be coupled with the dual output electric motor 324 as described above. The dual-output electric motor includes two rotors and two stators. The rotors can provide rotational output through concentric output shafts. A first rotor 344 can be coupled with an inner output shaft 346 and a second rotor 348 can be coupled with an outer output shaft 350; the inner output shaft 346 and the outer output shaft 350 are concentric to each other. The inner output shaft 346 can be coupled with the first eccentric shaft 328 and the outer output shaft 350 can be coupled with the second eccentric shaft 332. The first camshaft phaser 308 and the second camshaft phaser 310 can be operated in a similar way as those shown in FIG. 5 as is described above.

Figure 7:
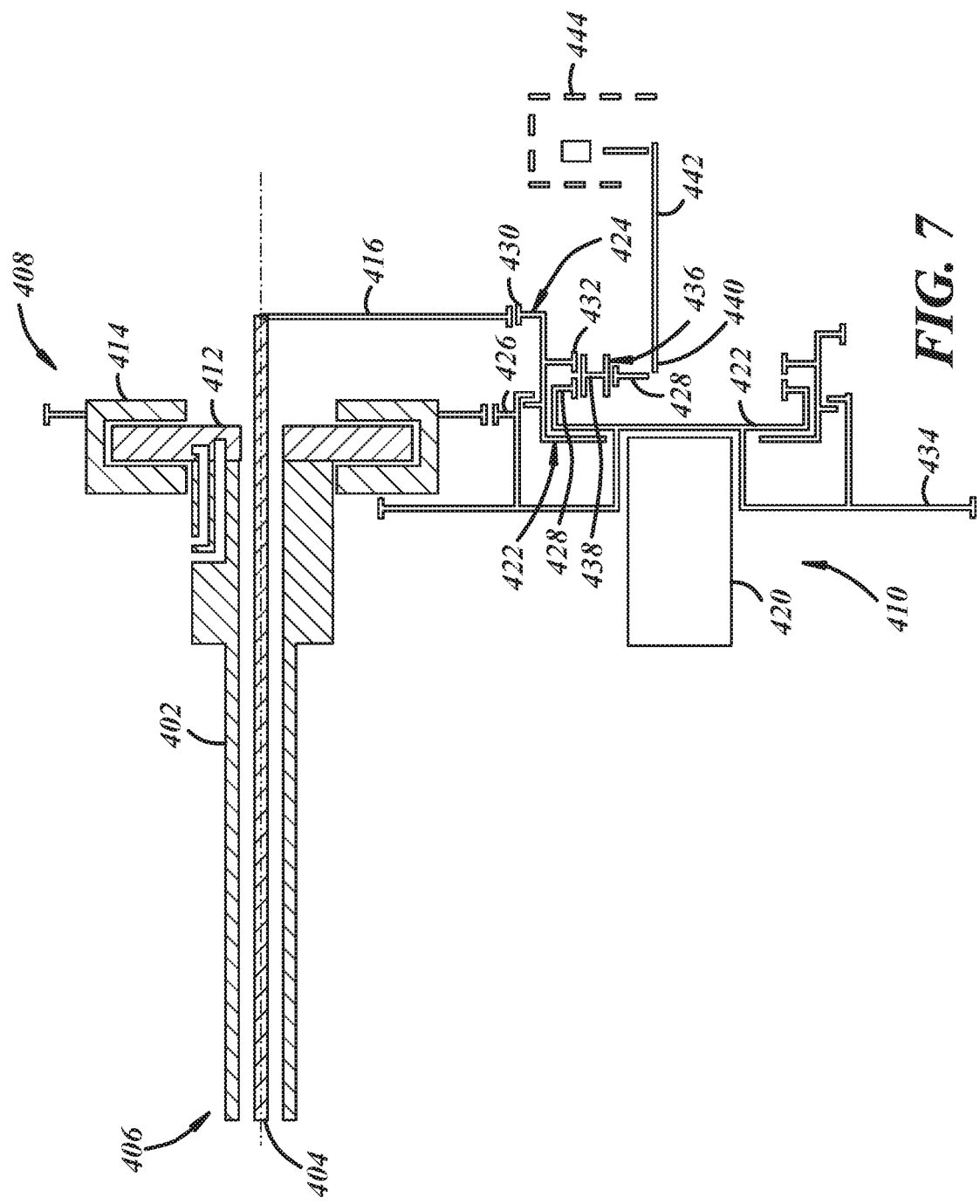
FIG. 7 is a cross-sectional profile view depicting another implementation of a VCT system including a hydraulically-actuated camshaft phaser, an electrically-actuated camshaft phaser, and a concentric camshaft assembly.

Another implementation of a variable camshaft timing system (VCT) 400 is shown in FIG. 7. The VCT system 400 includes a first camshaft 402 and a second camshaft 404 that are concentric to each other forming a concentric camshaft assembly 406 as well as a first camshaft phaser 408 and a second camshaft phaser 410. The first camshaft phaser 408 is coupled with the first camshaft 402 (e.g. an outer camshaft) and a second camshaft phaser 410 is coupled with the second camshaft 404 (e.g. an inner camshaft). The first camshaft phaser 408 is implemented using a hydraulically-actuated camshaft phaser and the second camshaft phaser 410 is implemented using an electrically-actuated camshaft phaser. The first camshaft phaser 408 and the second camshaft phaser 410 each include an input and an output the can be angularly displaced relative to each other.

The first camshaft phaser 408 can include a rotor 412 and a stator 414. The rotor 412 can be the output of the first camshaft phaser 402 that is coupled to a distal end of the first camshaft 402. The stator 414 can act as a housing that receives the rotor 412, as is described above with respect to FIG. 1, and be the input of the first camshaft phaser 408. The housing or stator can include an inner camshaft input sprocket 416 having a plurality of teeth extending radially outwardly from an outer surface of the first camshaft phaser 408 and be the input for the first camshaft phaser 408. The output of the first camshaft phaser 408 can be directly coupled to a distal end of the inner camshaft 404.

The second camshaft phaser 410 can be attached to an idler shaft 420 that is spaced apart from the concentric camshaft assembly 406 such that the second camshaft phaser 410 rotates around a different axis than the first camshaft phaser 408 and the concentric camshaft assembly 406. The second camshaft phaser 410 can include an outer camshaft drive sprocket 422 and an inner camshaft drive sprocket 424. The outer camshaft drive sprocket 422 can include an outer camshaft drive sprocket gear 426 that includes a plurality of radially-outwardly facing gear teeth and an outer camshaft drive ring gear 428 that includes a plurality of radially-inwardly facing gear teeth. The inner camshaft drive sprocket 424 can include an inner camshaft drive sprocket gear 430 that includes a plurality of radially-outwardly facing gear teeth and an inner camshaft drive ring gear 432 that includes a plurality of radially-inwardly facing gear teeth. The inner camshaft drive sprocket 424 can also include a crankshaft drive sprocket gear 434 that includes a plurality of radially-outwardly facing gear teeth that engage and receive rotational force from a crankshaft sprocket (not shown) linked to a distal end of the crankshaft. A planetary gearbox 436 including a plurality of planetary gears 438 can engage both the inner camshaft drive ring gear 432 and the outer camshaft drive ring gear 428. A sun gear 440 coupled with an output shaft 442 of an electric motor 444 can engage the planetary gears 438.

The crankshaft sprocket attached to the crankshaft engages the crankshaft drive sprocket gear 434 and communicates rotational force from the crankshaft to the inner camshaft drive sprocket 424. The inner camshaft drive sprocket 424 engages the inner camshaft input sprocket 416 and the rotational force from the crankshaft is ultimately communicated from the inner camshaft drive sprocket 430 to the inner camshaft input sprocket 416. The rotor 412 of the first camshaft phaser 408 can be angularly displaced relative to the stator 414 (and the crankshaft) as is described above with respect to hydraulically-actuated camshaft phasers. The outer camshaft drive sprocket 422 is coupled with the crankshaft drive sprocket gear 434, which can be implemented using a snap ring or mechanical fasteners, such as bolts. An electric motor rotates the output shaft 442 while the engine is operational and crankshaft and the concentric camshaft assembly are rotating. The electric motor 444 turns the output shaft 442 and the sun gear 440 at the same angular velocity as the ring gears 420,432 to maintain the angular position of the outer camshaft 402 with respect to the crankshaft. The angular position of the outer camshaft 402 can be varied relative to the crankshaft by increasing or decreasing the angular velocity of the output shaft 442 of the electric motor 444 thereby increasing or decreasing the angular velocity of the sun gear 440. The increase or decrease in the angular velocity of the sun gear 440 rotates the planetary gears 438 relative to the inner camshaft drive ring gear 432 and the outer camshaft drive ring gear 428. The inner camshaft drive ring gear 432 and the outer camshaft drive ring gear 428 can each have a different number of gear teeth. As described above, one of the inner camshaft drive ring gear 432 or the outer camshaft drive ring gear 428 can have three fewer gear teeth than the other ring gear such that rotating the sun gear 440 and planetary gears 438 relative to the inner camshaft drive ring gear 432 and the outer camshaft drive ring gear 428 can displace the inner camshaft drive ring gear 432 relative to the outer camshaft drive ring gear 428 thereby changing the angular position of the outer camshaft 402 relative to the crankshaft.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A variable camshaft timing system, comprising:
a first camshaft phaser having an input that is configured to receive rotational force from a crankshaft and an output that is configured to link with a first camshaft of a concentric camshaft assembly to change an angular position of the first camshaft relative to the crankshaft;
a second camshaft phaser having an output that is configured to link with a second camshaft of the concentric camshaft assembly to change an angular position of the second camshaft relative to the crankshaft, wherein the first camshaft is concentrically positioned relative to the second camshaft and the first camshaft phaser is mechanically linked to the second camshaft phaser to communicate rotational force from the crankshaft to the second camshaft phaser through the first camshaft phaser; and
a dual-output electric motor comprising a first rotor and a second rotor, wherein the first camshaft phaser is coupled to the first rotor and the second camshaft phaser is coupled to the second rotor.

2. The variable camshaft timing system recited in claim 1, further comprising a flex plate that couples the first camshaft phaser to the second camshaft phaser.

3. The variable camshaft timing system recited in claim 1, wherein the first camshaft phaser is hydraulically-actuated and the second camshaft phaser is electrically-actuated.

4. The variable camshaft timing system recited in claim 3, wherein the first camshaft phaser and the second camshaft phaser rotate about a common axis.

5. The variable camshaft timing system recited in claim 1, wherein the dual-output electric motor comprises concentric output shafts.

6. The variable camshaft timing system recited in claim 1, wherein the first camshaft phaser, the second camshaft phaser, or both include one or more planetary gears engaging a sun gear, a ring gear, and a sprocket gear.

7. The variable camshaft timing system recited in claim 1, wherein the first camshaft phaser, the second camshaft phaser, or both include a first eccentric shaft, a second eccentric shaft, and a compound planetary gear.

8. A variable camshaft timing system, comprising:
a first electrically-actuated camshaft phaser having an output that is configured to couple with a first camshaft of a concentric camshaft assembly and change an angular position of the first camshaft relative to a crankshaft using at least one planetary gear;

a second electrically-actuated camshaft phaser having an output that is configured to couple with a second camshaft of the concentric camshaft assembly and change an angular position of the second camshaft relative to the crankshaft using at least one planetary gear, wherein the second camshaft is concentrically positioned to the first camshaft;

a housing, configured to receive rotational force from the crankshaft, having a ring gear that engages the planetary gear(s) of the first electrically-actuated camshaft phaser and the planetary gear(s) of the second electrically-actuated camshaft phaser, wherein the first electrically-actuated camshaft phaser, the second electrically-actuated camshaft phaser, the first camshaft, the second camshaft, and the housing rotate about a common axis.

9. The variable camshaft timing system recited in claim 8, further comprising a dual-output electric motor comprising a first rotor and a second rotor, wherein the first electrically-actuated camshaft phaser is coupled to the first rotor and the second electrically-actuated camshaft phaser is coupled to the second rotor.

10. The variable camshaft timing system recited in claim 9, wherein the dual-output electric motor comprises concentric output shafts.

11. The variable camshaft timing system recited in claim 8, wherein the first electrically-actuated camshaft phaser comprises a first sun gear engaging the planetary gear(s) of the first electrically-actuated camshaft phaser and a second sun gear engaging the planetary gear(s) of the second electrically-actuated camshaft phaser.

12. The variable camshaft timing system recited in claim 8, further comprising a first eccentric shaft, a second eccentric shaft, a first compound planetary gear, and a second compound planetary gear.

* * * * *